(12) United States Patent
Kunde et al.

(10) Patent No.: US 9,471,369 B2
(45) Date of Patent: Oct. 18, 2016

(54) METHODS AND SYSTEMS FOR SHARING COMPUTATIONAL RESOURCES

(71) Applicant: Xerox Corporation, Norwalk, CT (US)

(72) Inventors: Shruti Kunde, Mumbai (IN); Tridib Mukherjee, Bangalore (IN); Sujit Gujar, Newar City Pride (IN)

(73) Assignee: Xerox Corporation, Norwalk, CT (US)

( * ) Notice: Subject to any disclaimer, the term of this patent is extended or adjusted under 35 U.S.C. 154(b) by 70 days.

(21) Appl. No.: 14/242,165

(22) Filed: Apr. 1, 2014

(65) Prior Publication Data

US 2015/0281117 A1 Oct. 1, 2015

(51) Int. Cl.
*G06F 9/46* (2006.01)
*H04L 12/24* (2006.01)

(52) U.S. Cl.
CPC ............. *G06F 9/46* (2013.01); *H04L 41/5019* (2013.01)

(58) Field of Classification Search
None
See application file for complete search history.

(56) References Cited

U.S. PATENT DOCUMENTS

| | | | | |
|---|---|---|---|---|
| 2011/0145413 | A1* | 6/2011 | Dawson et al. | 709/226 |
| 2013/0091284 | A1* | 4/2013 | Rothschild | 709/226 |
| 2013/0160007 | A1* | 6/2013 | Cawlfield et al. | 718/1 |

OTHER PUBLICATIONS

Antonio Carzaniga. "Architectures for an Event Notification Service Scalable to Wide-area Networks." PhD thesis, Politecnico di Milano, Italy, 1998.
Peter Pietzuch. Hermes—"A Scalable Event-Based Middleware." PhD thesis, Queens College, University of Cambridge, UK, 2004.
S Bhola, R Strom, S Bagchi, Y Zhao, and J Auerbach. "Exactly-once Delivery in a Content based Publish-Subscribe System." In Proc. of the Int. Conf. on Dependable Systems and Networks (DSN'2002), pp. 7-16, 2002.

* cited by examiner

*Primary Examiner* — Vivek Srivastava
*Assistant Examiner* — Hien Doan (57) ABSTRACT

Methods and systems for sharing computational resources. A request from a first node is received for the one or more computational resources. The request comprises a service level agreement (SLA) associated with the requested one or more computational resources. The request is compared with one or more advertisements sent by at least two second nodes, other than the first node. The one or more advertisements correspond to an availability of a set of computational resources associated with each of the at least two second nodes. A portion of computational resources from the set of computational resources associated with each of the at least two second nodes is allocated to the first node, based on the comparison, such that a combination of the portion of computational resources satisfy the SLA associated with the request.

15 Claims, 4 Drawing Sheets

METHODS AND SYSTEMS FOR SHARING COMPUTATIONAL RESOURCES

TECHNICAL FIELD

The presently disclosed embodiments are related, in general, to a distributed computing environment. More particularly, the presently disclosed embodiments are related to methods and systems for sharing computational resources in the distributed computing environment.

BACKGROUND

Distributed computing refers to a computing network in which one or more interconnected computing devices co-operate with each other by sharing one or more computational resources (e.g., instances of CPUs, RAM, disk-space, etc). One of the types of distributed computing is volunteer computing in which computer owners can voluntarily donate the computational resources associated with their respective computing devices. For example, the computer owners can help certain projects that require high levels of processing powers and memory usage by sharing these computational resources, when the computing devices associated with these computer owners are in an idle state.

Generally, in a volunteer computing network, one or more requesters request for the computational resources (e.g., for executing the workload/applications) and one or more providers can donate the computational resources in case of availability of the computational resources associated with the computing devices. However, the requesters and the providers in the volunteer computing network are typically decoupled in terms of time (i.e., the requesters and the providers may not be available at the same time to exchange the computational resources), in terms of space (i.e., the requesters and the providers may be located in different parts of the world), and in terms of synchronization (i.e., the requesters may not be blocked till the computational resources are made available). In such a scenario, the problem of sharing computational resources in the volunteer computing network becomes a non-trivial one.

SUMMARY

According to embodiments illustrated herein, there is provided a method for sharing one or more computational resources associated with one or more nodes in a network. The method includes receiving a request, from a first node from the one or more nodes, for the one or more computational resources. The request comprises a service level agreement (SLA) associated with the requested one or more computational resources. The method further includes comparing the request with one or more advertisements sent by at least two second nodes, other than the first node. The one or more advertisements correspond to an availability of a set of computational resources associated with each of the at least two second nodes. The method further includes allocating a portion of computational resources from the set of computational resources associated with each of the at least two second nodes to the first node, based on the comparison, such that a combination of the portion of computational resources allocated from each of the at least two second nodes forms the one or more computational resources, and the combination of the portion of computational resources satisfy the SLAs.

According to embodiments illustrated herein, there is provided a system for sharing one or more computational resources associated with one or more nodes in a network. The system includes one or more processors configured to receive a request, from a first node from the one or more nodes, for the one or more computational resources. The request comprises a service level agreement (SLA) associated with the requested one or more computational resources. The one or more processors are further configured to compare the request with one or more advertisements sent by at least two second nodes, other than the first node. The one or more advertisements correspond to an availability of a set of computational resources associated with each of the at least two second nodes. The one or more processors are further configured to allocate a portion of computational resources from the set of computational resources associated with each of the at least two second nodes to the first node, based on the comparison, such that a combination of the portion of computational resources allocated from each of the at least two second nodes forms the one or more computational resources, and the combination of the portion of computational resources satisfy the SLAs.

According to embodiments illustrated herein, there is provided a computer program product for use with a computer. The computer program product includes a non-transitory computer readable medium. The non-transitory computer readable medium stores a computer program code for sharing one or more computational resources associated with one or more nodes in a network. The computer program code is executable by one or more processors to receive a request, from a first node from the one or more nodes, for the one or more computational resources. The request comprises a service level agreement (SLA) associated with the requested one or more computational resources. The computer program code is further executable by the one or more processors to compare the request with one or more advertisements sent by at least two second nodes, other than the first node. The one or more advertisements correspond to an availability of a set of computational resources associated with each of the at least two second nodes. The computer program code is further executable by the one or more processors to allocate a portion of computational resources from the set of computational resources associated with each of the at least two second nodes to the first node, based on the comparison, such that a combination of the portion of computational resources allocated from each of the at least two second nodes forms the one or more computational resources, and the combination of the portion of computational resources satisfy the SLAs.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

A "computing device" refers to a device that includes a processor/microcontroller and/or any other electronic component, or a device or a system that performs one or more operations according to one or more programming instructions. Examples of the computing device include, but are not limited to, a desktop computer, a laptop, a personal digital assistant (PDA), a mobile phone, a smart-phone, a tablet computer, and the like. In an embodiment, the one or more computing devices correspond to one or more requesters and one or more providers.

"Computational resources" refer to resources associated with the one or more computing devices, required for executing an application/workload. The computational resources may correspond to, but are not limited to, processor instances, storage space, RAM space, software applications, security services, and database services.

An "enterprise infrastructure" refers to an aggregation of the one or more computing devices. In an embodiment, each enterprise infrastructure is represented by an MCI agent installed on a node representing that enterprise infrastructure. In an embodiment, the one or more computational resources associated with the one or more nodes correspond to the one or more computational resources associated with the computing devices in the one or more enterprise infrastructures represented by the one or more nodes.

A "node" refers to a physical server in a communication network. In an embodiment, one or more nodes may be interconnected in the communication network. Each of the one or more nodes may represent the one or more computing devices and may control the sharing of the computational resources. In an embodiment, the one or more nodes have information pertaining to availability of the one or more computational resources associated with the one or more computing devices in respective enterprise infrastructure. In an embodiment, a node may transmit a request for the one or more computational resources to one or more neighboring nodes. Further, a node may allocate the one or more computational resources to the other nodes in the communication network.

"Requester" refers to at least one computing device in an enterprise infrastructure that requires one or more computational resources. In an embodiment, the requester may require the one or more computational resources to execute the applications/workloads. In an embodiment, the at least one computing device in an enterprise infrastructure may transmit a request for the computational resources to a node representing the enterprise infrastructure. In another embodiment, the requestor may correspond to a computing device that is not connected to the enterprise infrastructure. Such requestor may forward the request for the one or more computational resources to one or more nodes.

"Providers" may refer to one or more computing devices that may share the one or more computational resource with the one or more requesters. In an embodiment, the one or more providers may transmit an advertisement corresponding to the availability of the computational resources to a node representing an enterprise infrastructure.

A "trusted provider" refers to a provider that the requesters consider to be trusted in receiving the one or more computational resources. In an embodiment, the requesters, while transmitting the requests for the computational resources, may indicate in the SLAs that the computational resources are required only from the trusted providers. In an embodiment, such indication may be provided through a one-bit parameter that depicts if the resources are required from the trusted providers. Further, a list of the providers that are considered trusted by the one or more requesters may be maintained in the one or more nodes.

An "MCI agent" refers to an application/tool/framework installed on a node. The MCI agent may control the sharing of the computing resources between the computing devices. In an embodiment, the MCI agent maintains the information pertaining to the requests for one or more computational resources (received from the one or more other nodes) and information pertaining to availability of computational resources in the in the enterprise infrastructure. In an embodiment, the MCI agent installed on a node, that represents an enterprise infrastructure, acts as a gateway to other enterprise infrastructures.

A "service level agreement (SLA)" refers to terms in a contract between the requesters and the providers. In an embodiment, the SLAs may state the expectations agreed upon by the requesters and the providers for sharing the one or more computational resources. For example, in an embodiment, the SLAs terms may correspond to at least one of a type of the requested one or more computational resources (e.g., small/medium/large VMs), a count of the requested one or more computational resources, a start time associated with a use of the requested one or more computational resources, an end time associated with a use of the requested one or more computational resources, a cost associated with the requested one or more computational resources, or a trust factor associated with the requested one or more computational resources.

A "set of computational resources" refers to a total capacity of the computational resources associated with a node. Thus, the set of computational resources associated with a node refers to a total capacity of the computational resources available in the enterprise infrastructure represented by that node.

A "portion of computational resources" refers to a subset of the set of computational resources associated with a node. In an embodiment, the portion of the computational resources associated with a node may correspond to the computational resources that at least partially satisfy the SLAs associated with a request from a requester.

"Allocation of computational resources" refers to a process of allocating the computational resources to the one or more requesters. In an embodiment, a node may allocate the one or more computational resources, received from the one or more providers, to the one or more requesters. In an embodiment, the one or more applications/workloads may be transmitted to the providers that may execute the received applications/workloads and share the outputs of the applications/workloads with the requesters. Further, in an embodiment, the one or more computational resources may be shared by the providers in the form of virtual machines (VMs), such that the requesters may transmit the applications/workloads to the providers for the execution of the applications/workload through the shared VMs.

A "distributed computing network" refers to a computing network, in which one or more computing devices associated with one or more requesters and providers are interconnected over the communication network. Further, the one or more providers may share the computational resources with the one or more requesters over the communication network. In an embodiment, sharing of the one or more computational resources relate to one or more requestors sending an application to the one or more providers for execution. Hereinafter, the terms "distributed computing network", "volunteer computing network", and "computing network", are used interchangeably.

A "virtual machine (VM)" refers to a software that emulates a physical computing environment on a computing device upon which an operating system (OS) or program can be installed and run. The virtual machines may be installed upon a virtualization layer such as a virtualization platform or a hypervisor that manages the virtual machine and handles communication between the virtual machine and the underlying physical hardware of the computing devices. In an embodiment, the requesters may request for the computational resources from the providers in the form of the virtual machines (VMs). For example, a collection of, 1 GB RAM, 2 CPUs, and a disk space of 20 GB may constitute one virtual machine.

A "request" refers to a message that corresponds to a requirement of the one or more computational resources by the one or more computing devices in an enterprise infrastructure. The one or more computing devices in the enterprise infrastructure may transmit the request to a node representing the enterprise infrastructure. In an embodiment, the request may include SLAs (e.g., as disclosed above) associated with the requested one or more computational resources. In an alternative embodiment, the request may be originated by a computing device that is not a part of the communication network. In such a scenario, the request may be received at an application server that may further forward the request to a node.

An "advertisement" refers to a message that corresponds to the availability of the one or more computational resources associated with the one or more nodes. In an embodiment, each of the nodes may generate an advertisement based on the computational resources associated with that node and may transmit the advertisement through the MCI agent to all neighboring MCI agents installed on neighboring nodes.

An "advertisement routing table (ART)" refers to a table, maintained by the one or more nodes, that includes information pertaining to the advertisements transmitted by the neighboring nodes. Hence, the ART includes entries corresponding to the computational resources available with the neighboring nodes.

A "subscription routing table (SRT)" refers to a table, maintained by the one or more nodes, that includes information pertaining to the one or more requests from the one or more requesters. In an embodiment, the requester may transmit the request to one or more neighboring nodes (via MCI agent) and subsequently the one or more neighboring nodes may maintain the information pertaining to the requests in the respective SRTs.

A "notification" refers to a message generated by the one or more nodes based on the matching of the SLAs with the computational resources available with the one or more nodes. In an embodiment, if the SLAs associated with the request from a requester are partially satisfied by the computational resources available with a node, then also the node may send the notification to the requester.

Figure 1:
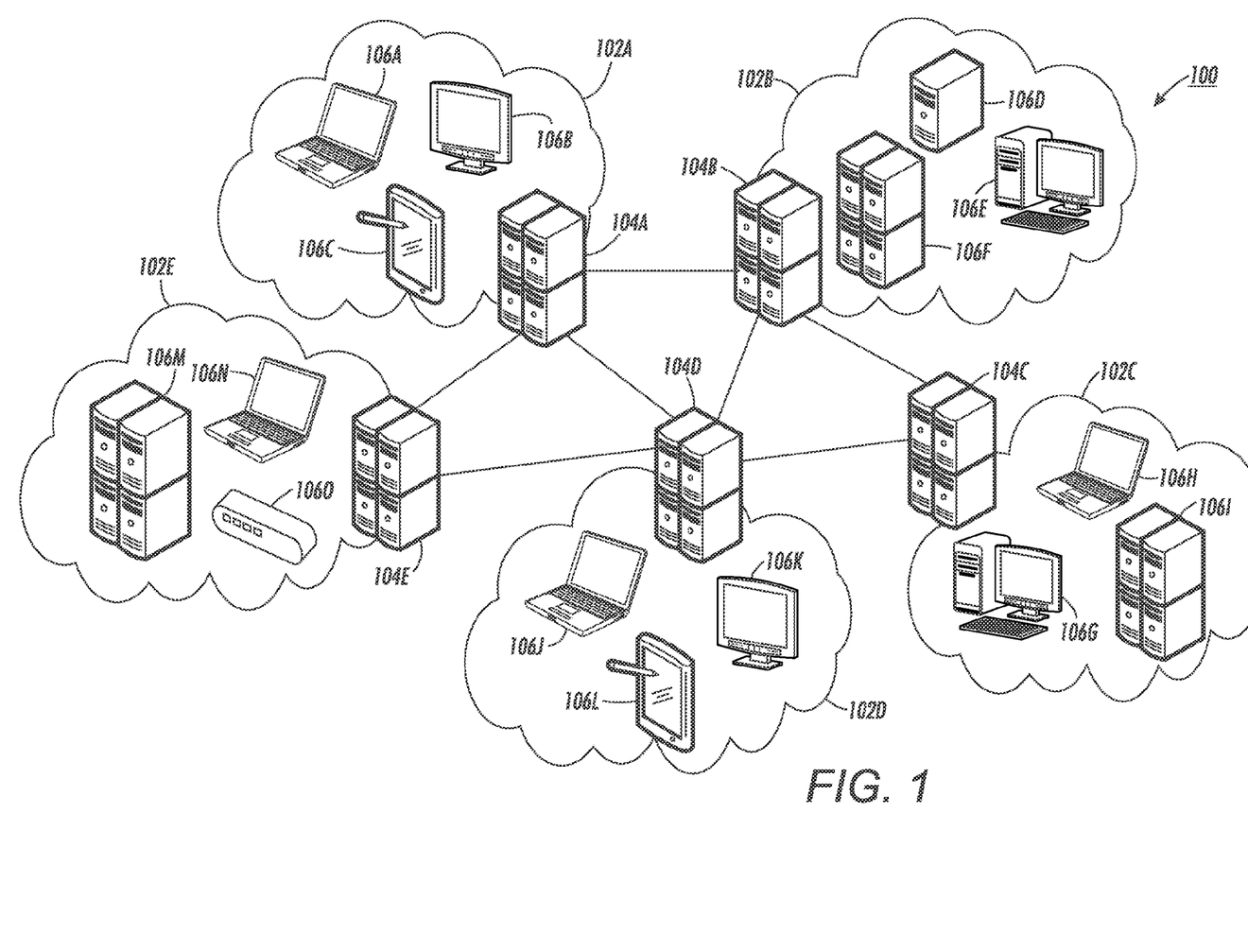
FIG. 1 is a block diagram illustrating a system environment in which various embodiments may be implemented.

FIG. 1 is a block diagram illustrating a system environment 100 in which various embodiments can be implemented. The system environment 100 includes one or more enterprise infrastructures 102A-E (hereinafter collectively referred to as enterprise infrastructures 102), one or more nodes 104A-E (hereinafter collectively referred to as one or more nodes 104), and one or more computing devices 106A-0 (hereinafter collectively referred to as the one or more computing devices 106). In an embodiment, each of the one or more enterprise infrastructures 102 (e.g., the enterprise infrastructure 102A) may be represented by a respective node (e.g., the node 104a). Further, the one or more nodes 104 may be interconnected by a communication network (not depicted in the FIG. 1).

The one or more enterprise infrastructures 102 refer to aggregation of the one or more computing devices 106. For example, as depicted in FIG. 1, the enterprise infrastructure 102A includes the computing devices 106A-C. In an embodiment, the one or more computing devices 106 may be aggregated based on the factors such as geographical locations, types of the computing devices, network to which the one or more computing devices are connected, and so forth. For example, all the computing devices 106 in an organization in a particular geographical area may constitute the enterprise infrastructure 102A. In a similar way, in an organization, different physical servers may be aggregated to form the enterprise infrastructure 102A, whereas laptops or desktop computers may be aggregated to form the enterprise infrastructure 102B. In an embodiment, the enterprise infrastructure 102A may generate a request for the one or more computational resources (e.g., to execute an application/workload) and the one or more enterprise infrastructures 102 may provide the computational resources.

The one or more nodes 104 may refer to one or more physical servers that represent the respective enterprise infrastructures 102. In an embodiment, the node 104A, from the one or more nodes 104, may be selected from the one or more computing devices 106A-C. In an alternate embodiment, the node 104A may be a different physical server from the one or more computing devices 106A-C. Further, an MCI agent may be installed on each of the one or more nodes 104, such that each of the MCI agents represents respective enterprise infrastructures 102. The MCI agent may refer to a middleware application that controls the sharing of the computational resources available in the enterprise infrastructures 102. In an embodiment, a first node 104A may receive a request for sharing the computational resources from the computing device 106A, along with the associated SLAs. The first node 104A determine whether the SLAs can be satisfied by the computing devices 106B-C, by matching the computational resources associate with the computing devices 106B-C with the SLAs associated with the request. In case the SLAs cannot be satisfied by the computing devices 106B-C, the first node 104A may transmit the request to the one or more neighboring nodes 104B, 104D, and 104E to search for the computational resources. Further details about the sharing of the computational resources have been discussed later in conjunction with FIG. 3. In an embodiment, the one or more nodes 104 may be realized through various types of servers such as, but not limited to, Java server, .NET framework, and Base4 server.

In an embodiment, the one or more computing devices 106 correspond to the devices that have the associated one or more computational resources. As discussed above, the one or more computing devices 106 are aggregated to form an enterprise infrastructure (e.g., the enterprise infrastructure 102A). In an embodiment, the one or more computing devices 106 may share the one or more computational resources amongst each other. As disclosed, in an embodiment, the computing device 106A may request for the computational resources along with the SLAs. Further, the request may be transmitted to the first node 104A. In an embodiment, the computing device 106A receives the computational resources from at least two enterprise infrastructures 102 that satisfy the SLAs. The computing devices 106 may include a variety of computing devices, such as a desktop, a laptop, a personal digital assistant (PDA), a tablet computer, and the like.

It will be apparent to a person skilled in the art that various devices in the system environment, as disclosed above, may be interconnected over the communication network, such that messages/signals flow between the various devices through the network. Examples of the network may include, but are not limited to, a Wireless Fidelity (Wi-Fi) network, a Wireless Area Network (WAN), a Local Area Network (LAN), or a Metropolitan Area Network (MAN). Further, various devices in the system environment 100 may be interconnected in accordance with various wired and wireless communication protocols such as Transmission Control Protocol and Internet Protocol (TCP/IP), User Datagram Protocol (UDP), and 2G, 3G, or 4G communication protocols.

In an alternate embodiment, the system environment 100 may include an application server (not depicted in the FIG. 1). The application server may be connected with each of the one or more nodes 104. In an embodiment, the application server may receive a request from a requester that is not connected to the communication network. In such a scenario, the application server may determine a node (e.g., 104B) nearest to the requestor (e.g., determined based on network latency between requestor and the node 104B). Thereafter, the node 104B may allocate the one or more computational resources based on the availability. In an embodiment, the determination of the availability of the one or more computational resources has been described later in conjunction with FIG. 3.

Figure 2:
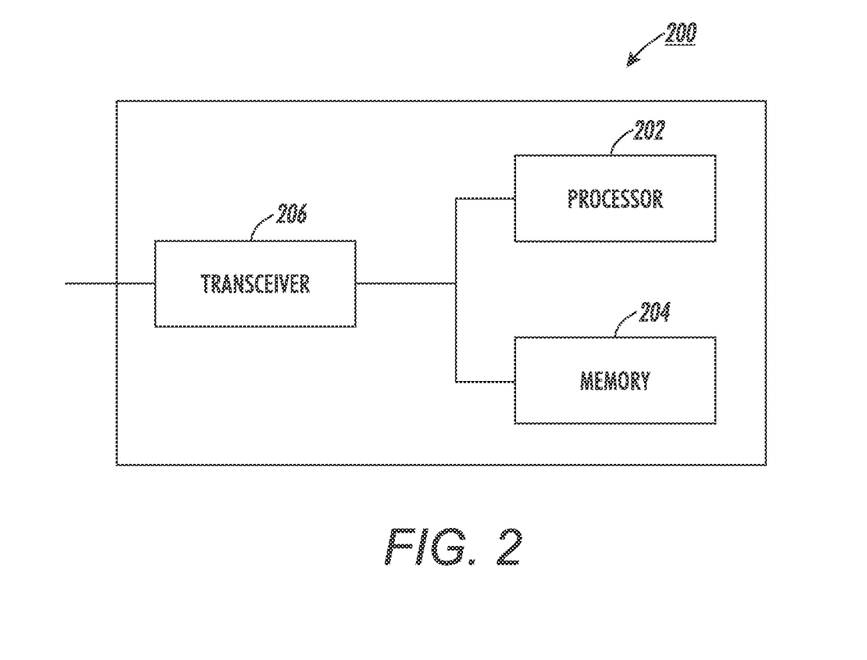
FIG. 2 is a block diagram illustrating a system for sharing the one or more computational resources, in accordance with at least one embodiment.

FIG. 2 is a block diagram illustrating a system 200, in accordance with at least one embodiment. The system 200 includes a processor 202, a memory 204, and a transceiver 206. In an embodiment, the system 200 corresponds to the node 104b, from the one or more nodes 104.

The processor 202 is coupled to the memory 204 and the transceiver 206. The processor 202 includes suitable logic, circuitry, and/or interfaces that are operable to execute one or more instructions stored in the memory 204 to perform predetermined operation. The memory 204 may be operable to store the one or more instructions. The processor 202 may be implemented using one or more processor technologies known in the art. Examples of the processor 202 include, but are not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It will be apparent to a person having ordinary skills in the art that the one or more instructions stored in the memory 204 enables the hardware of the node 104b to perform the predetermined operation.

The transceiver 206 transmits and receives messages and data to/from various devices of the system environment 100 (e.g., the one or more nodes 104). Examples of the transceiver 206 may include, but are not limited to, an antenna, an Ethernet port, a USB port or any other port that can be configured to receive and transmit data. The transceiver 206 transmits and receives data/messages in accordance with the various communication protocols, such as, TCP/IP, UDP, and 2G, 3G, or 4G communication protocols. Operation of the system 200 has been described in conjunction with FIG. 3.

Figure 3:
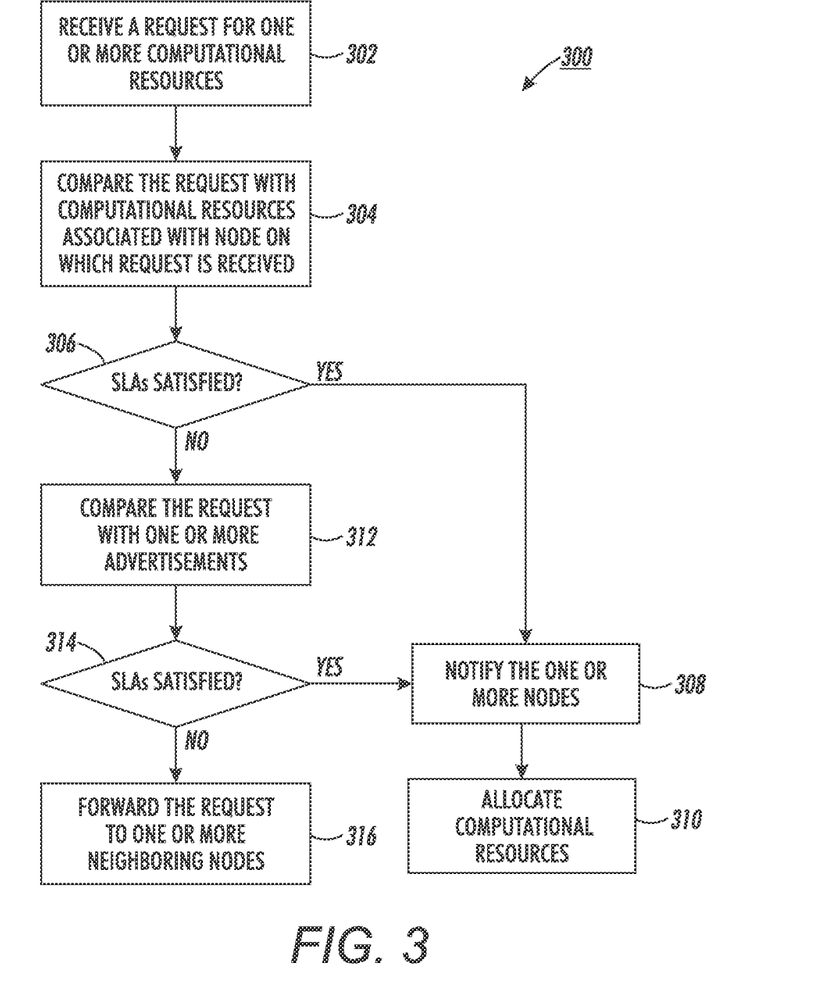
FIG. 3 is a flowchart illustrating a method for sharing the one or more computational resources, in accordance with at least one embodiment.

FIG. 3 is a flowchart 300 illustrating a method for sharing the one or more computational resources, in accordance with at least one embodiment. For the purpose of ongoing disclosure, the method for sharing the one or more computational resources is implemented on the node 104B. However, a person having ordinary skill in the art would understand that the scope of the disclosure is not limited to sharing the one or more computational resources by the node 104B. In an embodiment, the method can be implemented on any of the node in the one or more nodes 104. The flowchart 300 is described in conjunction with FIG. 1 and FIG. 2.

At step 302, a request for the one or more computational resources is received from the first node 104a. The processor 202 may receive the request from the first node 104A. In an embodiment, the computing device 106A in the enterprise infrastructure 102A may require the computational resources for executing the application/workload and may transmit the request, along with the SLAs, to the first node 104A. The SLAs may include the one or more parameters corresponding to the one or more requested computational resources. For example, the SLAs may include information about the types of the computational resources required to execute the applications. Further, the SLAs may include the count of the computational resources requested by the computing device 106a. Other requirements included in the SLAs may include, but are not limited to, a start time associated with the use of the requested one or more computational resources, an end time associated with a use of the requested one or more computational resources, a cost associated with the requested one or more computational resources, a trust factor associated with the requested one or more computational resources, and so forth. The start time and end time associated with the use of the computational resources indicate the time stamps during which the computational resources are required by the computing device 106A. The cost associated with the computational resources indicates the monetary value that the requester is willing to pay for the one or more computational resources. In an embodiment, the requester may specify the maximum limit for the cost of the one or more computational resources. In an embodiment, the cost associated with the computational resources may include other forms of the remuneration such as, but not limited to, lottery tickets, gift items, shopping vouchers, and discount coupons. In another embodiment, the cost may include strengthening the relationship between the requesters and the providers. For example, the requester may also allow access to its computational resources, in lieu of sharing the computational resources by a provider. The trust factor indicates that the requester wants that the computational resources should be provided only from a trusted provider. The list of the trusted providers may be maintained by each of the one or more nodes 104. In an embodiment, in the request, the trust factor is a single bit parameter that indicates whether the one or more computational resources are required from the trusted providers. Table 1 provided below illustrates SLAs associated with the request from the computing device 106A.

TABLE 1

Illustration of the SLAs associated with the request.

| Request | Type of computational resources | Count of the computational resources | Start time | End Time | Cost ($) | Trust Factor |
|---|---|---|---|---|---|---|
| Request-1 | 2 CPUs, 2 GB RAM, 40 GB disk-space | 2 | 06:00 AM | 08:00 AM | 0.5 | 1 |
| Request-2 | 4 CPUs, 4 GB memory, 40 GB disk-space | 3 | 05:00 AM | 05:30 AM | 1.0 | 0 |
| Request-3 | 8 CPUs, 8 GB memory, 500 GB disk-space | 2 | 04:00 AM | 05:00 AM | 1.5 | 1 |

It will be apparent to a person having ordinary skill in the art that the above Table 1 has been provided only for illustration purposes and should not limit the scope of the invention to these types of SLAs only. For example, the requirements included in the SLAs may be different from the depicted requirements and may include more or less requirements than depicted in Table 1.

In an alternate embodiment, a request may be received at an application server (not depicted in the FIG. 1). Further, the application server may be connected with each of the one or more nodes 104. In such a scenario, the application server may forward the request to the node 104A. Subsequently, the processor 202 may receive the request from the node 104A.

In an embodiment, the first node 104a may determine the availability of the computational resources in the associated enterprise infrastructure (i.e., the enterprise infrastructure 102A). For example, if the first node 104A determines that the computational resources from the computing devices 106B-C may satisfy the SLAs associated with request, the first node 104a may allocate the computational resources to the requester computing device 106A. However, if the computational resources are not available with the computing devices 106B-C, in entirety, the request for the computational resources is forwarded to the processor 202. The processor 202 may receive the request from the first node 104A along with the SLAs.

In an embodiment, the request from the first node 104a may be received in the form of below tuple:

$$R=\{C,N,T_s,T_e,P,Y\}$$

where,

R=request for the one or more computational resources received from the first node 104a, C=Capability (i.e. the type) of the computational resources, N=Count of the one or more computational resources, $T_s$=Start time, from when the computational resources are required, $T_e$=End time, till when the computational resources are required, P=Price (i.e. the cost) of the computational resources, and Y=Trust factor associated with the computational resources, such that:

Y=1 indicates the computational resources are required from trusted provider, and Y=0 indicates that the computational resources may not be from trusted provider.

In an embodiment, the request from the first node 104A may be a combination of the different requirements for the computational resources. In such a scenario, there may be different types of the requests, as described below:

Parallel Request:

The request for the one or more computational resources refers to a parallel request if a computing device 106 (e.g., computing device 106A) in an enterprise infrastructure (e.g., the enterprise infrastructure 102A) requires the one or more computational resources simultaneously. For example, if the computing device 106A requires three instances of the CPUs of the capacity 100 MHz, 150 MHz, and 200 MHz simultaneously, such that all the three instances are required at the same start time, then the request will be a parallel request. As an example, three events (corresponding to the requirements from the first node 104A), in the form of tuples $\{C, P, T_s, T_e\}$ are:

$C_1=\{R_1, \$1, 04{:}00\ AM, 05{:}00\ AM\}$,
$C_2=\{R_2, \$1.5, 04{:}00\ AM, 06{:}00\ AM\}$, and
$C_3=\{R_3, \$1.25, 04{:}00\ AM, 05{:}30\ AM\}$, where, $R_1$, $R_2$, and $R_3$ depict three different computational resources requested by the first node 104A.

As can be observed from the above example, the computational resources (i.e., $R_1$, $R_2$, and $R_3$) are required simultaneously. Thus, such a request will form a parallel request. It will be understood by a person having ordinary skill in the art that there may be scenarios of parallel request when start times are different (for example, when there is some overlap of the time for which the computational resources are required).

Sequential Request:

The request for the computational resources from the first node 104A constitutes a sequential request if the computational resources are required one after other, in a sequential manner. As an example, three events (corresponding to the requirements from the first node 104A), in the form of tuples $\{C, P, T_s, T_e\}$ are:

$C_1=\{100\ MHz, \$1, 04{:}00\ AM, 05{:}00\ AM\}$,
$C_2=\{200\ MHz, \$1.5, 05{:}00\ AM, 06{:}00\ AM\}$, and
$C_3=\{300\ MHz, \$1.25, 06{:}00\ AM, 07{:}30\ AM\}$.

As can be observed from the example above that the requirement is such that the resource of the capacity 200 MHz is required right after the resource of capacity 100 MHz (i.e., 05:00 AM onwards). Similarly, the resource of the capacity 300 MHz is required after the resource of the capacity 200 MHz is used (i.e., 06:00 AM onwards). Thus, the request from the first node 104A is a sequential request.

As a separate example, request-3 and request-2 (refer Table 1) may constitute a sequential request, since it can be observed from Table 1 that the computational resources associated with the request-2 are required right after the computational resources associated with the request-3.

Iterative Request:

Request for the computational resources from the first node 104a forms an iterative request if the computational resources from the first node 104a are required in an iterative manner. For example, if a CPU resource of capacity 200 MHz is required for three times one after the other, the request will be an iterative request. In an embodiment, same resource is used to serve the iterative request.

It will be understood by a person having ordinary skill in the art that the present disclosure should not be limited to these types of the requests only and the above types of the requests are discussed just for illustration purposes. Requests from the first node 104A may be received in different manner than the types of the requests illustrated above.

In an embodiment, the processor 202 may insert the request, along with the SLAs, in a subscription routing table (SRT) maintained by it. SRTs are maintained by each of the nodes 104 in the communication network and include information pertaining to the requests received from the neighboring nodes. One typical illustration of the SRT, as maintained by the processor 202 is provided below in Table 2:

TABLE 2

Illustration of the SRT

| Request | Node | SLAs (in the form of tuples $\{C, P, T_s, T_e\}$) |
|---|---|---|
| Request-1 | Node 104A | {50 MHz, $1.5, 02:00 AM, 02:30 AM} |
| Request-2 | Node 104C | {100 MHz, $1, 04:00 AM, 06:00 AM} |
| Request-3 | Node 104D | {200 MHz, $1, 04:00 AM, 06:00 AM} |

It can be observed from the Table 2 that the request-1 is received from the first node 104A along with the associated SLAs. Further, request-2 and request-3 are received from the nodes 104C, and 104D, respectively. The processor 202 maintains the requests along with the requirements associated with the request. For example, the processor 202 determines that the request-1 requires a computational resource with capacity 50 MHz between 02:00 AM and 02:30 AM. Further, the processor 202 determines that the computational resource should cost less than or equal to $1.5. Similarly, the processor 202 determines that the request-2 requires a computational resource of capacity 100 MHz between 04:00 AM and 06:00 AM with a cost constraint of $1. In an embodiment, each of the entry in the SRT, as depicted above in Table 2, is maintained for a predetermined time interval. That is, whenever a new request is received by the processor 202 and an entry is made for that request in the SRT, then that entry is kept in the SRT for the predetermined time interval. Post the expiration of the predetermined time interval, the processor 202 removes or deletes the request from the SRT table.

It will be understood by a person having ordinary skill in the art that the request-1, request-2, and request-3, as illustrated in the Table 2, may be originated by same or different computing devices 106A-C.

At step 304, the request from the first node 104A is compared with the computational resources associated with the node 104B, on which the request is received. The processor 202 may determine the SLAs associated with the request, using the SRT, and may compare the SLAs with the computational resources available in the enterprise infrastructure 102B. In an embodiment, the computational resources available with the enterprise infrastructure 102B is depicted in below provided Table 3:

TABLE 3

Illustration of computational resources associated with the enterprise infrastructure 102B.

| Provider | SLAs (in the form of tuples $\{C, P, T_s, T_e\}$) |
|---|---|
| Computing Device 106D | {50 MHz, $1, 02:00 AM, 02:30 AM} |
| Computing Device 106E | No resources available |
| Computing Device 106F | {100 MHz, $1, 04:00 AM, 05:00 AM} |

It can be observed from the Table 3 that the processor 202 has the information pertaining to the computational resources available with the enterprise infrastructure 102B. For example, the processor 202 maintains the information that the computing device 106D in the enterprise infrastructure 102B can share a resource of the capacity 50 MHz between 02:00 AM and 02:30 AM. The cost associated with the computational resource from the computing device 106d is $1. Thus, the processor 202 can compare the SLAs as maintained in the SRT with the available computational resources in the enterprise infrastructure 102B.

At step 306, it is determined whether the SLAs are satisfied by the computational resources available in the enterprise infrastructure 102B. The processor 202 may determine this based on the comparison done in the step 304. If the processor 202 determines that the SLAs associated with the request can be satisfied by the computational resources available with the enterprise infrastructure 102B, step 308 is performed, else step 312 is performed.

In an embodiment, to compare the cost constraint in the SLAs, the processor 202 may utilize below equation:

$$P=\Sigma_{i=1}^{l} K_i * nR_i, \quad (1)$$

where,

P=total cost of the computational resources from the at least two second nodes, l=different types of the computational resources, n=number of computational resources of a particular resource $R_i$ $K_i$=cost associated with the computational resource $R_i$.

At step 308, the first node 104A is notified. Thus, if the SLAs associated with one or more requests get fully satisfied by the computational resources associated with the enterprise infrastructure 102B, the processor 202 may notify the first node 104A. For example, the processor 202 compares the SLAs in the request-1 and request-2 (refer Table 2), with the computational resources available with the enterprise infrastructure 102B (depicted in the Table 3). The processor 202 determines that the request-1 gets satisfied by the computational resources available in the enterprise infrastructure 102B (i.e., the computing device 106D), whereas SLAs associated with the request-2 are satisfied partially by the computing device 106F (since resources are available until 05:00 AM, instead of 06:00 AM). Thus, for request-1, the processor 202 notifies the first node 104A in conjunction with the step 308, whereas for the request-2, step 312 is performed.

It will be understood by a person skilled in the art that the request-1 may also be satisfied by a combination of computational resources in the enterprise infrastructure 102B. For example, the request-1 may be satisfied by combining the computational resources associated with the computing devices 106D and 106E, instead of the computing device 106D alone.

At step 310, the computational resources are allocated to the first node 104A. In an embodiment, when the request is received from a computing device not connected on the communication network, the first node 104A may forward the allocation to the computing device. As discussed, for the request-1, the processor 202 determines that the SLAs are satisfied, and thus the processor 202 may allocate the computational resources (i.e., the resource with capacity 50 MHz between 02:00 AM and 02:30 AM) to the first node 104A. In an embodiment, the processor 202 may schedule the allocation of the computational resources, using known techniques in the art, such that the computational resources are allocated to the first node 104A in the required time intervals (i.e., between 02:00 AM and 02:30 AM). Further, as discussed, for the request-2 step 312 is performed, since the SLAs are not satisfied in entirety by the computational resources available in the enterprise infrastructure 102B.

At step 312, the one or more requests from the node 104A are compared with the advertisements received from the second nodes 104C-E. In an embodiment, the processor 202 compares the one or more requests with the advertisement. The advertisements refer to the messages sent by the one or more second nodes 104C-E and correspond to the availability of the computational resources in the one or more second nodes 104C-E. In an embodiment, a node may transmit the advertisement message to one or more neighboring nodes. For example, the second nodes 104C may send the one or more advertisements to the node 104B and 104D. The processor 202 may insert each of the advertisement in an advertisement routing table (ART). As disclosed, the ART refers to a table that includes information pertaining to the one or more advertisements from the one or more second nodes 104C-E. Table 4 provided below illustrates the ART maintained by the processor 202:

TABLE 4

Illustration of advertisement routing table (ART) maintained by the node 104B

| Provider | SLAs (in the form of tuples $\{C, P, T_s, T_e\}$) |
|---|---|
| Node 104C | {100 MHz, $3, 05:00 AM, 05:30 AM} |
| Node 104D | {100 MHz, $1, 05:30 AM, 07:00 AM} |

As can be observed from the Table 3, the ART includes entries corresponding to the computational resources associated with the one or more second nodes 104C-D. For example, it can be observed that the enterprise infrastructure 102C may provide computational resources with a capacity of 100 MHz between 05:00 AM and 05:30 AM. Further, the cost expected by the node 104C for the sharing of the computational resources is $3. Similarly, availability of the computational resources in the second node 104D is maintained in the ART, as depicted the Table 4.

Considering the example of the one or more requests as depicted in the Table 2, the processor 202 compares the SLAs associated with the request-2 with the advertisements available in the ART (depicted in the Table 4).

At step 314, the processor 202 again determines whether the SLAs associated with the request are satisfied. For example, the processor 202 determines whether the SLAs associated with the request gets satisfied by the combination of the computational resources available with the enterprise infrastructure 102B and the one or more second nodes 104C-D (whose information is available in the ART), or the combination of the computational resources available with the one or more second nodes 104C-D. If the processor 202 determines that the SLAs are satisfied, step 308 is performed, else step 316 is performed.

As discussed, at step 308, the processor 202 notifies the first node 104A about the fulfillment of the SLAs associated with the request. In an embodiment, if the processor 202 determines that the SLAs are satisfied by the combination of the computational resources associated with the one or more second nodes 104C-D, the processor 202 notifies each of the first node 104A and the one or more second nodes 104C-D. For example, for the request-2, the processor 202 observes that the combination of the computational resources available with the node 104C and the node 104D, in combination with the computational resource availability with the enterprise infrastructure 102B, fully satisfies the SLAs associated with the request-2. It can be observed that the computational resource of the capacity 100 MHz can be provided by the node 104C between 05:00 AM and 05:30 AM and between 05:30 AM and 06:00 AM, the computational resources with capacity 100 MHz can be provided by the node 104D. Thus, all the requirements in the SLAs get satisfied by these combinations. In such a scenario, the processor 202 notifies the first node 104A and the second nodes 104C and 104D.

In an embodiment, the notification criterion can be represented by below provided equation:

$$\text{Iff } \exists \, a_i \hat{O} s_j, j=\{1, 2 \ldots n\}, \text{ and } i=\{1, 2 \ldots n\}$$

where,
$a_i$ represents the set of the advertisement,
$s_j$ represents the set of requests, and
$\hat{O}$ represents a covering relationship.

That is, the notification to a node is sent if and only if there exits one or more advertisements in the ART that covers a request in the SRT. One or more advertisements are said to cover a request if they satisfy (in combination with the computational resources available in the enterprise infrastructure, in which the request is received) all the requirements in the SLAs associated with the request.

It will be understood by a person having ordinary skill in the art that the SLAs associated with any request received from the first node 104A may also be satisfied by a single second node, instead of a combination of the computational resources form the two second nodes, as discussed above (i.e., the second nodes 104C and 104D). Similarly, in an embodiment, combination of computational resources from more than two second nodes may satisfy the SLAs, without departing from the scope of the invention.

As discussed, if at step 314, it is determined that the SLAs are satisfied neither by the combination of the computational resources available with the enterprise infrastructure 102B and the one or more second nodes 104C-D, nor by the computational resources available with the one or more second nodes 104C-D, then step 316 is performed.

At step 316, the request for the computational resources is forwarded to the one or more second nodes 104C-D (i.e., the neighboring nodes of the node 104B).

It will be apparent to a person having ordinary skill in the art that similar steps, as discussed for the flowchart 300, may be performed by the one or more second nodes 104C-D, when the request is forwarded to these nodes by the processor 202, along with the associated SLAs.

In an alternate embodiment, the one or more nodes 104 may represent a cloud-computing infrastructure. Further, each of the one or more nodes 104 may receive a request from one or more computing devices 106, as disclosed above. The one or more computing devices 106 may be included in the cloud-computing infrastructure represented by the respective nodes 104, or may be external to the cloud-computing network. Further, the request may be accompanied with the requirement of the one or more virtual machines (e.g., to execute one or more applications/workloads). In such a scenario, the one or more virtual machines may be shared by the one or more nodes 104, in accordance with the steps disclosed above.

In an alternate embodiment, the one or more computing devices 106 may correspond to peer nodes in a peer-to-peer network. In such a scenario, the one or more computational resources may be shared amongst the one or more computing devices 106, in accordance with the steps disclosed above.

Figure 4:
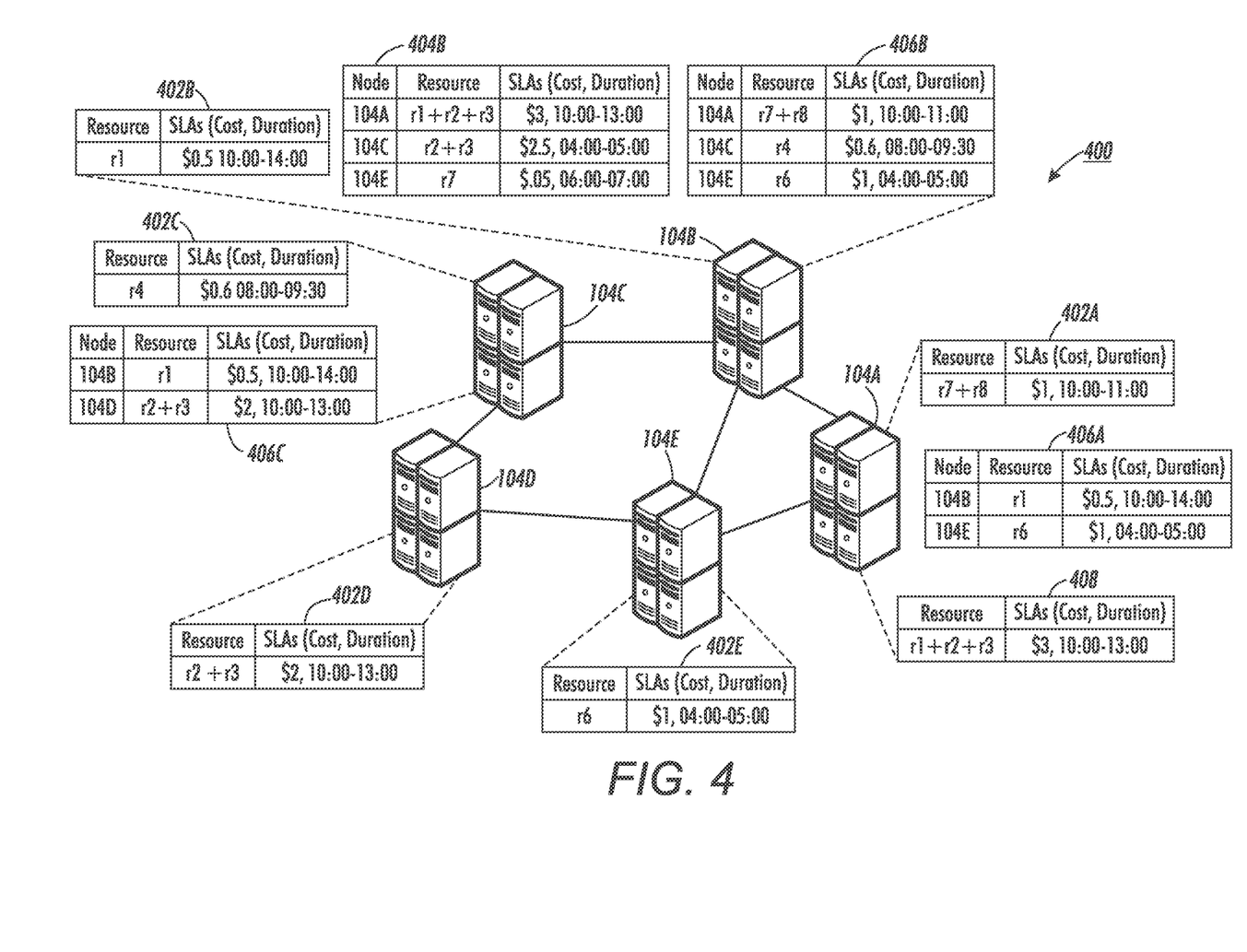
FIG. 4 illustrates a block diagram for sharing the one or more computational resources in a communication network, in accordance with at least one embodiment.

FIG. 4 illustrates a block diagram 400 for sharing the computational resources in the communication network, in accordance with at least one embodiment of the present disclosure. The block diagram 400 includes the one or more nodes 104. Each of the one or more nodes 104 includes a resource table (e.g., 402A, 402B), a subscription routing table (SRT) 404B, advertisement routing tables (ART) 406A-C, and a request table 408.

Each of the one or more nodes 104 refers to a physical server that represents respective enterprise infrastructure (not depicted in the FIG. 4), as disclosed in conjunction with the FIG. 1.

Each of the resource tables 402A-E refers to a table that includes the computational resources associated with the corresponding node. For example, as depicted, the node 104A has the computational resource (r7+r8) available with it, between the time interval 10:00 hrs. and 11:00 hrs. Further, it can be observed that the computational resources available with the node 104A have a cost of $1 associated with it. In a similar way, other resource tables 402B-E include the information pertaining to the computational resources available with respective nodes.

The SRT 404B corresponds to a table maintained by the node 104B that includes information pertaining to the one or more requests transmitted by the neighboring nodes of the node 104B. For example, as shown in the SRT 404B, the node 104B maintains that the node 104A requires a combination of the resources (i.e., r1+r2+r3) between 10:00 hrs. and 13:00 hrs. Further, the cost associated with the computational resources (r1+r2+r3) is $3. In a similar way, one or more requests from other neighboring nodes of the node 104B are maintained in the SRT 404B. In an embodiment, each of the nodes 104A-E maintains the SRTs (not depicted for the nodes 104B-E, in the FIG. 4) that include information pertaining to the requests received from the respective neighboring nodes.

Each of the ARTs 406A-C corresponds to a table maintained by the respective node that includes the information pertaining to the advertisements transmitted by the one or more neighboring nodes. For example, as depicted, the ART 406A includes the information pertaining to the advertisements transmitted by the neighboring nodes of the node 104A (i.e., the node 104B and the node 104E). As discussed in conjunction with the FIG. 3, the one or more advertisements indicate the availability of the computational resources in the respective nodes. For example, it can be observed from the ART 406A that the nodes 104B and 104E can provide the computational resources r1 and r6, respectively, along with the associated SLAs. In an embodiment, each of the nodes 104A-E maintain ARTs (not depicted for the nodes 104D-E, in the FIG. 4) that include the information pertaining to the advertisements received from the respective neighboring nodes.

The request 408 refers to a request for computational resources r1+r2+r3 originated by the node 104A. Further, the request 408 has associated SLAs. As depicted in the request 408, the cost associated with the computational resources is $3. Further, the computational resources (i.e., r1+r2+r3) are required between 10:00 hrs. and 13:00 hrs. In an embodiment, the request 408 may be originated by one or more computing devices in the enterprise infrastructure represented by the node 104A. In an alternate embodiment, the request 408 may be received by the node 104A from an external computing device that is not the part of the communication network, as disclosed in conjunction with FIG. 3.

It will be apparent to a person skilled in the art though only cost and time duration are illustrated in the FIG. 4, as part of the SLAs, other parameters may also be included in the SLAs (as discussed in conjunction with the definition of the SLA provided above), without limiting the scope of the invention. Further, the resources may refer to various types of the computational resources, or to one or more virtual machines, as defined above.

In accordance with at least one embodiment of the present disclosure, the node 104A receives the request 408 for the computational resources (i.e., r1+r2+r3). As discussed in conjunction with FIG. 3, the node 104a determines if the SLAs can be satisfied by the enterprise infrastructure represented by it. Since the resource table 402A depicts that the request 408 is not satisfied by the computational resources available with the node 104A (i.e., r7+r8), the node 104A determines if the SLAs may be satisfied by the one or more other nodes (e.g., by referring to the ART 406A). For example, the node 104A determines, by referring the ART 406A, that the computational resource r1 may be provided by the node 104B, however, the computational resources r2+r3, in the request 408 are not satisfied. In such a scenario, the node 104A forwards the request 408 to its neighboring nodes (i.e., the node 104B and the node 104E). On receiving the request 408, each of the nodes 104B and 104E inserts the request 408 in the respective SRTs (SRTs for the nodes 104B-E are not depicted, in the FIG. 4).

Subsequently, each of the nodes 104B and 104E determines if the SLAs associated with the request 408 are satisfied by the respective enterprise infrastructures (by referring to the resource tables 402B and 402E, respectively). For example, the node 104B determines, by referring the resource table 402B, that the computational resource r1 can be provided to the node 104A satisfying the cost and time constraint in the SLA of the request 408. In such a scenario, the node 104B notifies the node 104A. Further, the node 104B determines the fulfillment of the SLAs by referring to the ART 406B. Since it can be observed that the SLAs are not satisfied even by the combination of the computational resources available in the resource table 402B and the ART 406B, the node 104B forwards the request to its neighboring nodes (i.e., the node 104C and the node 104E). It will be appreciated by a person skilled in the art the in a similar way, the node 104E, by determining the fulfillment of the SLAs associated with the request 408 may forward the request 408 to its neighboring nodes.

Subsequently, on receiving the request 408 from the node 104B, the node 104C determines the availability of computational resources by referring the resource table 402C and the ART 406C. As it can be observed from the ART 406C that the computational resources r2+r3 may be provided by the node 104D, the node 104C notifies each of the node 104D and the node 104B. Subsequently, the notification may be forwarded to the node 104A (through the node 104B), and the computational resources may be allocated to the node 104A that may further allocate the resources to the requesting computing devices.

The disclosed embodiments encompass numerous advantages. Sharing of the computational resources between the requesters and the providers in a way, as disclosed above, can be an alternative to cloud-based service offerings and thus may save expenditures related to the cloud-based service offerings. Further, sharing the computational resources between the requesters and the providers has always been a big challenge because of the heterogeneous resources requirements from the requesters. In addition, the requesters and the providers are generally decoupled in terms of time (i.e., the requesters and the providers may not be available at the same point of time), in terms of the space (i.e., the requesters and the providers may be located in different geographies in the world), and in terms of synchronization (i.e., the requester may not be blocked till the resources of desired capacity are made available). Disclosed methods and systems describe a pub-sub (publishing-subscription) model that satisfies the computational resources requirements by comparing the SLAs associated with the requests with the advertisements sent by the resource providers. Thus, the provision of the computational resources to the requesters does not depend upon the simultaneous presence of the requesters and the providers. Further, the SLAs are guaranteed while sharing the computational resources. By combining the computational resources from different enterprise infrastructures, dependency to satisfy the SLAs by single enterprise infrastructure is overcome and the computational resources from different enterprise infrastructures may be utilized to guarantee the SLAs.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for sharing of the computational resources in a distributed computing network have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for sharing one or more computational resources to execute a workload at a first node, the method comprising:
   receiving, at a current node, a request from the first node for the one or more computational resources, wherein the request comprises a service level agreement (SLA) associated with the requested one or more computational resources;
   comparing, by the current node, the received request with information stored in an advertisement routing table (ART), wherein the ART corresponds to a table maintained at the current node, wherein the ART comprises the information pertaining to one or more advertisements received from each of neighboring one or more second nodes of the current node, other than the first node, wherein the one or more advertisements correspond to an availability of a set of computational resources associated with each of the neighboring one or more second nodes, and wherein the comparing the received request further comprises:
   (a) searching, at the current node, for the one or more computational resources at the neighboring one or more second nodes based on the one or more advertisements in the ART;
   (b) receiving, by the current node, a first notification from the neighboring one or more second nodes in response to the searching, wherein the first notification includes information pertaining to an availability of the portion of the computational resources; and
   (c) transmitting, by the current node, a second notification to the first node if the combination of the one or more first computational resources and the one or more second computational resources forms the one or more computational resources; and
   allocating, by the current node, a combination of one or more first computational resources selected from the set of computational resources associated with each of the neighboring one or more second nodes, and one or more second computational resources selected from the set of computational resources associated with the current node to the first node, based on the comparison, wherein the combination of the one or more first computational resources allocated from each of the neighboring one or more second nodes, and the one or more second computational resources associated with the current node forms the one or more computational resources, and wherein the combination satisfies the SLA of the received request; and
   maintaining, at the current node, a subscription routing table (SRT).

2. The method of claim 1, wherein the one or more computational resources that satisfy the SLA are provided by the current node, other than the first node, on which the request is received.

3. The method of claim 2, wherein the request is transmitted to the neighboring one or more second nodes if the current node does not have the one or more computational resources that satisfy the SLA.

4. The method of claim 1, wherein the one or more nodes comprise the current node, the first node, the neighboring one or more second nodes, and the remaining nodes, wherein each of the one or more nodes represents an enterprise infrastructure including one or more computing devices, and wherein the one or more computational resources associated with the one or more nodes correspond to the one or more computational resources associated with the one or more computing devices.

5. The method of claim 1, wherein the one or more computational resources correspond to at least one of central processing units (CPUs), memory, or disk-space.

6. The method of claim 1, wherein the network is a peer-to-peer network, and wherein the one or more nodes correspond to peer nodes in the peer-to-peer network.

7. The method of claim 1, wherein the SRT comprises information pertaining to the request received from the first node neighboring the current node in the network.

8. The method of claim 1, wherein the SLA comprises at least one of a type of the requested one or more computational resources, a count of the requested one or more computational resources, a start time associated with a use of the requested one or more computational resources, an end time associated with a use of the requested one or more computational resources, a cost associated with the requested one or more computational resources, or a trust factor associated with the requested one or more computational resources.

9. A method of allocating one or more virtual machines in a cloud network, the method comprising:
   receiving, at a current node, a request from a first node for the one or more virtual machines, wherein the request comprises a service level agreement (SLA) associated with the requested one or more virtual machines;
   comparing, by the current node, the received request with information stored in an advertisement routing table (ART), wherein the ART corresponds to a table maintained at the current node, wherein the ART comprises the information pertaining to one or more advertisements received from each of neighboring one or more second nodes of the current node, other than the first node, wherein the one or more advertisements correspond to an availability of a set of virtual machines associated with each of the neighboring one or more second nodes; and wherein the comparing the received request further comprises:
   (a) searching, at the current node, for the one or more computational resources at the neighboring one or more second nodes based on the one or more advertisements in the ART;
   (b) receiving, by the current node, a first notification from the neighboring one or more second nodes in response to the searching, wherein the first notification includes information pertaining to an availability of the portion of the computational resources; and (c) transmitting, by the current node, a second notification to the first node if the combination of the one or more first computational resources and the one or more second computational resources forms the one or more computational resources; and allocating, by the current node, a combination of at least one virtual machine selected from the set of virtual machines associated with each of the neighboring one or more second nodes to the first node, and another virtual machine selected from the set of virtual machines associated with the current node, based on the comparison, wherein the combination of the at least one virtual machine allocated from each of the neighboring one or more second nodes and the other virtual machine associated with the current node forms the one or more virtual machines such that the SLA is satisfied; and maintaining, at the current node, a subscription routing table (SRT).

10. A system for sharing one or more computational resources associated with one or more nodes in a network to execute a workload at a first node, the system comprising:
one or more processors in a current node, the one or more processors being configured to:
receive a request, from the first node for the one or more computational resources, wherein the request comprises a service level agreement (SLA) associated with the requested one or more computational resources;
compare the received request with information stored in an advertisement routing table (ART), wherein the ART corresponds to a table maintained at the current node, wherein the ART comprises the information pertaining to one or more advertisements received from each of neighboring one or more second nodes of the current node, other than the first node, wherein the one or more advertisements correspond to an availability of a set of computational resources associated with each of the neighboring one or more second nodes; and
wherein the comparing the received request further comprises:
(a) searching for the one or more computational resources at the neighboring one or more second nodes based on the one or more advertisements in the ART;
(b) receiving a first notification from the neighboring one or more second nodes in response to the searching, wherein the first notification includes information pertaining to an availability of the portion of the computational resources; and
(c) transmitting a second notification to the first node if the combination of the one or more first computational resources and the one or more second computational resources forms the one or more computational resources;
allocate a combination of one or more first computational resources selected from the set of computational resources associated with each of the neighboring one or more second nodes, and one or more second computational resources selected from the set of computational resources associated with the current node to the first node, based on the comparison, wherein the combination of the one or more first computational resources allocated from each of the neighboring one or more second nodes and the one or more second computational resources associated with the current node forms the one or more computational resources, and wherein the combination satisfies the SLA;
wherein the one or more processors are further configured to maintain a subscription routing table (SRT).

11. The system of claim 10, wherein the one or more computational resources that satisfy the SLA are provided by the current node, other than the first node, on which the request is received.

12. The system of claim 10, wherein the one or more computational resources correspond to at least one of central processing units (CPUs), memory, or disk-space.

13. The system of claim 10, wherein the network is a peer-to-peer network, and wherein the one or more nodes correspond to peer nodes in the peer-to-peer network.

14. The system of claim 10, wherein the SRT comprise information pertaining to the request received from the first node neighboring the current node.

15. A computer program product for use with a computer, the computer program product comprising a non-transitory computer readable medium, wherein the non-transitory computer readable medium stores a computer program code for sharing one or more computational resources associated with one or more nodes in a network, wherein the computer program code is executable by one or more processors in a current node to:
receive a request from a first node for the one or more computational resources, wherein the request comprises a service level agreement (SLA) associated with the requested one or more computational resources;
compare the received request with information stored in an advertisement routing table (ART), wherein the ART corresponds to a table maintained at the current, wherein the ART comprises the information pertaining to one or more advertisements received from each of neighboring one or more second nodes of the current node, other than the first node, wherein the one or more advertisements correspond to an availability of a set of computational resources associated with each of the neighboring one or more second nodes wherein the comparing the received request further comprises:
(a) searching for the one or more computational resources at the neighboring one or more second nodes based on the one or more advertisements in the ART;
(b) receiving a first notification from the neighboring one or more second nodes in response to the searching, wherein the first notification includes information pertaining to an availability of the portion of the computational resources; and
(c) transmitting a second notification to the first node if the combination of the one or more first computational resources and the one or more second computational resources forms the one or more computational resources; and
allocate a combination of one or more first computational resources selected from the set of computational resources associated with each of the neighboring one or more second nodes, and one or more second computational resources selected from the set of computational resources associated with the current node to the first node, based on the comparison, wherein the combination of the one or more first computational resources allocated from each of the neighboring one or more second nodes, and the one or more second computational resources associated with the current node forms the one or more computational resources, and wherein the combination of the portion of computational resources and the other portion of computational resources satisfies the SLA;

wherein the one or more processors are further configured to maintain a subscription routing table (SRT).

* * * * *